Figure 1:
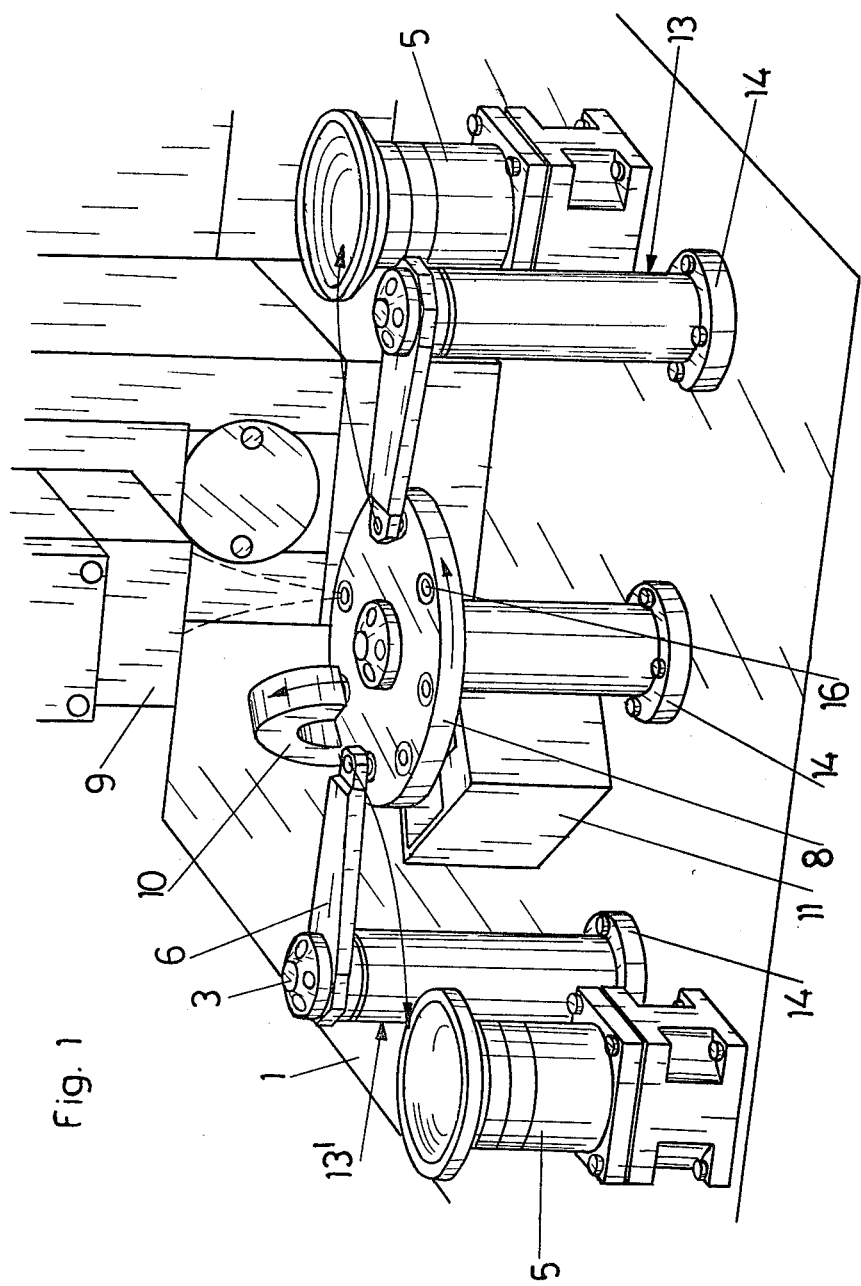

United States Patent [19]

Mayer

[11] 4,270,649
[45] Jun. 2, 1981

[54] METHOD FOR CONTROLLING OPERATING PROCESSES

[75] Inventor: Herbert E. Mayer, Eschen, Liechtenstein

[73] Assignee: CENSOR Patent- und Versuchs-Anstalt, Vaduz, Liechtenstein

[21] Appl. No.: 966,333

[22] Filed: Dec. 4, 1978

[51] Int. Cl.$^3$ .................. B65G 43/08; B65G 43/10
[52] U.S. Cl. ............................. 198/341; 29/407; 228/6 A; 228/102; 414/590; 414/744 B
[58] Field of Search ............... 228/102, 180 A, 6 A, 228/49; 29/710, 711, 712, 714, 407; 209/531, 905; 414/590, 744 B; 198/341

[56] References Cited
U.S. PATENT DOCUMENTS

| 3,499,204 | 3/1970 | Drop | 29/714 X |
| 3,731,867 | 5/1973 | Frisbie et al. | 29/714 X |
| 3,824,674 | 7/1974 | Inoyama et al. | 29/714 X |
| 4,151,945 | 5/1979 | Ragard et al. | 228/6 A |

Primary Examiner—Kenneth J. Ramsey
Attorney, Agent, or Firm—Haseltine and Lake

[57] ABSTRACT

A method and a device for controlling operating processes applied to particles. The device comprises a number of operating stations, such as, lifting- and sluing conveyors to allow for feeding the particles to an indexing rotary plate and conveying of particles to a processing stage, e.g. a welding device. The operating processes of the operating stations are initiated according to a common, pre-set cycle, at least one of the operating stations is associated with a correcting process initiated by a sensor arrangement for detecting faults in the operating process, for shortening the outages and for increasing the total output. The operating process involving a fault detected by the sensor arrangement is immediately interrupted, whereupon the correcting process is initiated independently of the common, pre-set cycle. The common, pre-set cycle serves to initiate dependent subsequent or previous operating processes of the operating stations until the end of the correcting process.

1 Claim, 4 Drawing Figures

METHOD FOR CONTROLLING OPERATING PROCESSES

BACKGROUND OF THE INVENTION

1. FIELD OF THE INVENTION

The present invention relates to a method and a device for controlling operating processes applied to particles, the device comprising a number of contrivances, the operating processes of said contrivances being initiated according to a common, pre-set cycle, at least one of the contrivances being associated with a correcting process initiated by sensor means detecting faults in the operating process.

2. DESCRIPTION OF THE PRIOR ART

It has become an important subdomain of industry to apply operating processes to particles. This is first of all due to the great number of operating processes whose automization has proved advantageous. Such processes are for example: feeding, defining shapes and positions; turning, positioning, palletizing, conveying, sorting out, depositing; processing, particularly forming, punching; embossing, breaking, cutting, sawing, marking, labelling, joining, welding, rivetting, assembling, inserting, threading, gluing; mechanic or electronic measuring, testing; counting, collecting until reaching set values, supervising, statistic plotting, packing and stamping. The above-mentioned and further operations can be applied to a great number of different parts, e.g. to mechanic components, such as pins, sheaths, bolts, rings, springs, or to structural members and elements for electronics and electrotechnics, such as crystals, discs, bodies of ceramics or plastics, bimetal members, switch-members, wire parts, soldering-plates, print-plates and circuit-elements.

The above-mentioned list of examples is by no means exhaustive as operating processes involving particles and their automization are also of importance in food industry, spectacle production and optic industry, jewelry production, toy industry, chemical industry etc.

All prior art processes of the above-described kind have the disadvantage that inevitable errors occurring in the course of the individual process cycles excessively influence the total output. If no correcting processes are provided the percentage of defective rejects rises to become uneconomic with the increasing number of operations. If, however, correcting programs are associated with the individual processing stages these corrections stop the whole device for one complete operating cycle, whereby the output per time unit will be excessively decreased.

SUMMARY OF THE INVENTION

It is, therefore, an object of the present invention to increase the output per time unit in a device comprising a number of dependent contrivances. For accomplishing this object the present invention provides a method wherein an operating process involving a fault detected by said sensor means is immediately interrupted, whereupon said correcting process is initiated independently of said common, pre-set cycle, said common, pre-set cycle for initiating dependent subsequent or previous operating processes of said contrivances being delayed until the end of said correcting process.

It is, therefore, a further object of the present invention to depart from the concept of the rigid pre-set operating cycle. In a device for accomplishing the process of the present invention cycle time means that all particles remain in one of the processing stages until the slowest subsystem has finished its operation. In the case of an entire faultless process no obvious difference is obtained with respect to the prior art processes with rigid machine cycles. The difference becomes suddenly evident, however, when an imperfect processing step has to be corrected. By means of the process in accordance with the present invention the time lag between the detection of the error and the end of the normal operation time of the slowest processing stage is gained. Frequently an error has already been corrected when the other processing stages, i.e. contrivances, have passed their normal routine so that the corrections made in accordance with the present invention cause no delay with respect to the normal course of the process. By departing from rigid machine cycles, as provided by the present invention, the amount of stop periods of the whole plant caused by error corrections can be minimized.

The process of the present invention can be applied to each operating cycle of a contrivance, which is associated with a correcting routine. The variety in this connection is as big as the number of possible processing operations. The effect of departing from the rigid machine cycle is particularly striking in the case of feeding devices adapted to insert particles individually into the receiving device.

DESCRIPTION OF AN EXAMPLE

In the following a practical example of the present invention will be described in more detail with reference to the figures of the drawing.

Figure 2:
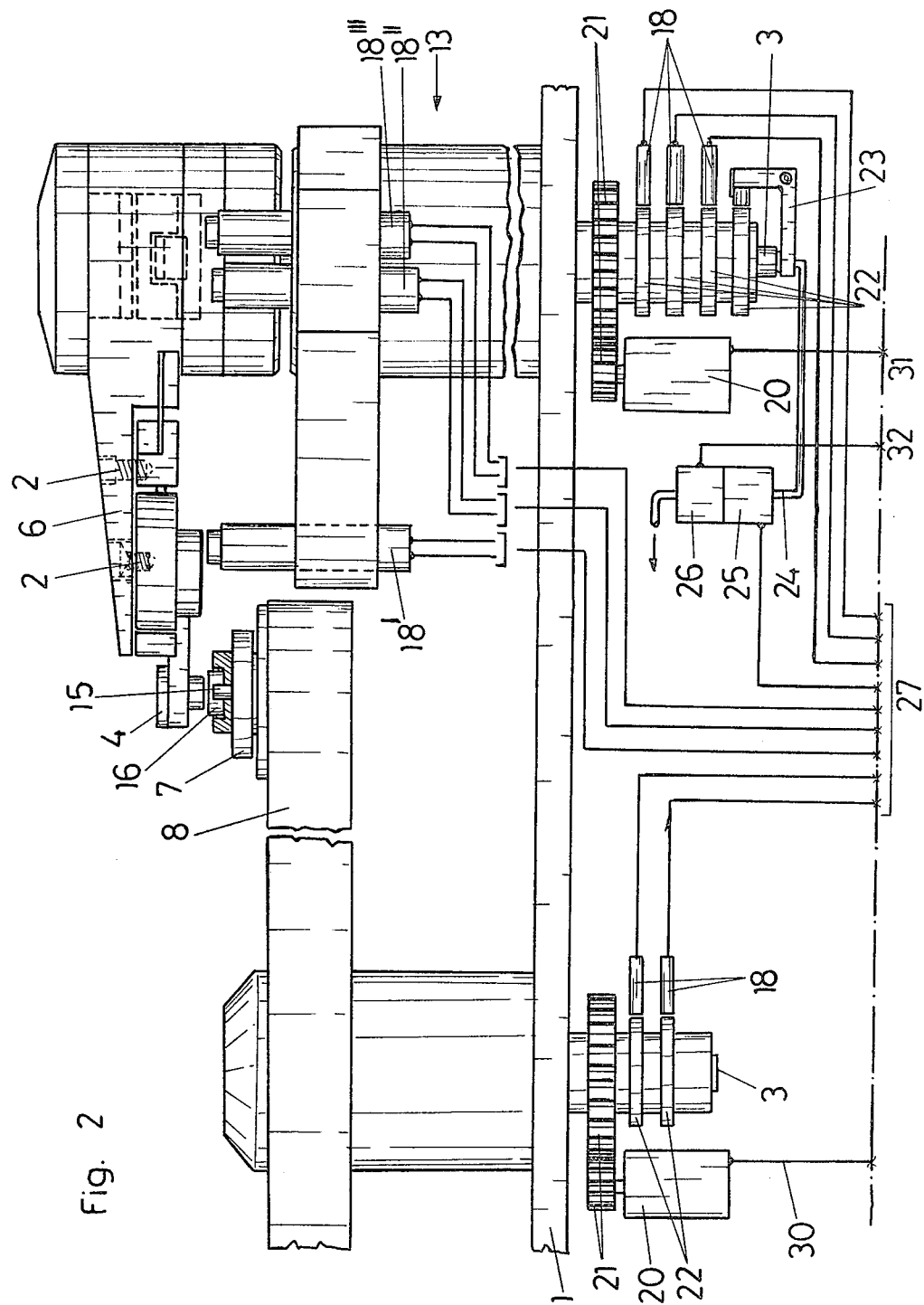
Figure 3:
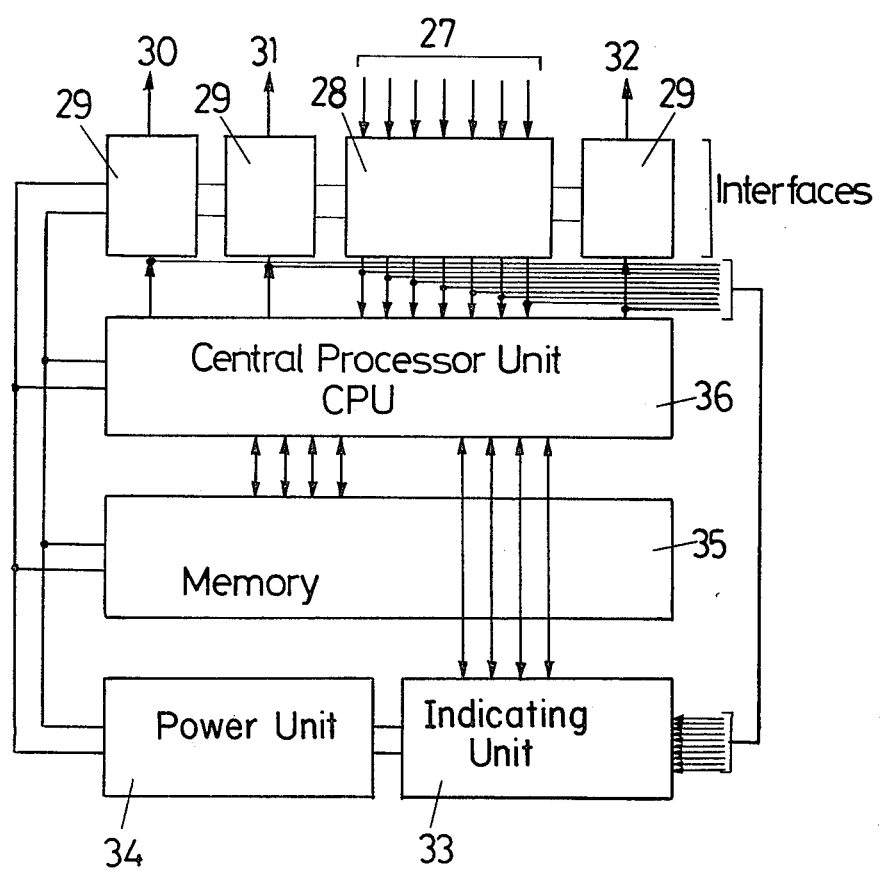
Figure 4:
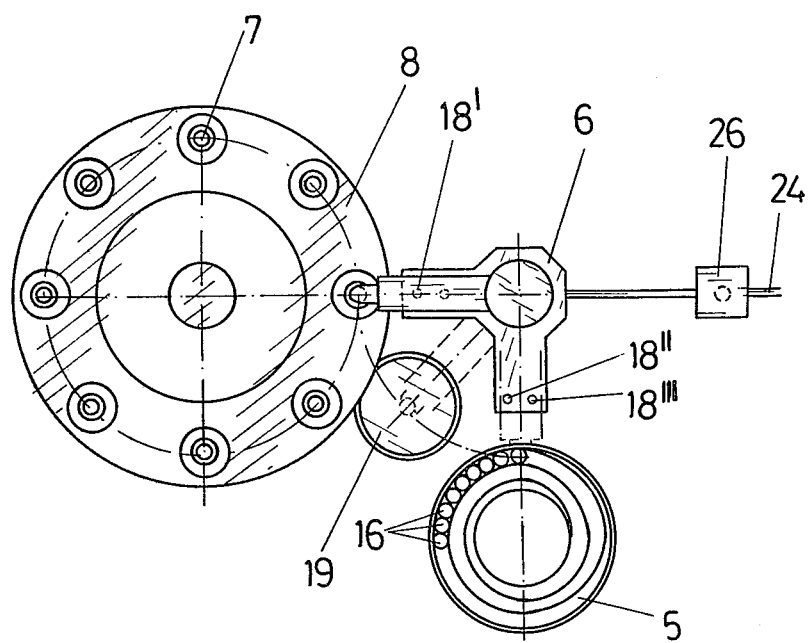

FIG. 1 shows a schematic perspective view of an embodiment of a device for accomplishing the process, FIG. 2 shows the side view of a contrivance of FIG. 1, parts thereof in section, FIG. 3 shows a block diagram of the control unit of the contrivance, and FIG. 4 shows the top view of the contrivance.

The device illustrated in FIG. 1 serves for the welding of small plates by means of a laser welding device 9, said plates being conveyed by means of two vibration conveyors 5. The illustrated device substantially comprises a mounting plate 1 on which, in addition to said vibration conveyors 5, two lifting- and sluing conveyors functioning as feeding devices 13, 13' are provided, their horizontally extending conveyor arms 6 being pivotable around shafts 3 extending upwards beyond the mounting plate 1. The vertically extending shafts 3 are mounted in bearing sheaths fastened to the upper side of the mounting plate 1 by means of flanges 14 in order to be lifted, lowered and pivoted from their position.

By means of the conveyor arms 6 air can be sucked in, thereby seizing one single particle 16 being subsequently fed to a receiving tool 7 in the indexing plate 8. The stacked plates are step-by-step fed from the indexing plate 8 to the welding device 9 and welded. The particles are finally collected in the deposit 10 and deposited in the container 11.

These operating processes of the contrivances are in a conventional manner initiated according to an operating cycle whose speed is defined by the length of the longest operating process.

In the following the invention will be described by means of two contrivances, an indexing plate 8 and a conveyor 13.

The conveyor arms 6 and the indexing plate 8 are moved by drive- and control aggregates disposed below the mounting plate 1. It is of advantage for the purpose of adjustment and test runs if said elements can also be moved by means of manual adjusting buttons, which are not illustrated.

Gearings 21 for the control of the rotary motion are disposed on the shafts 3, said gearings being connected with driving motors 20. Moreover, the shaft 3 of the indexing plate 8 has cams 22 corresponding with inductive proximity sensors 18, for example. The proximity sensors 18 define the position of the indexing plate 8 as they emit electric signals dependent on the shape and position of the cams 22. The shaft 3 of the lifting- and sluing conveyor 13 has four cams 22. The lowest one mechanically controls the lifting and lowering movement of the conveyor arms 6 dependent of its torsion by means of an angle lever 23 axially acting on the shaft.

The upper three cams 22 are associated with proximity sensors 18. Furthermore, a reduced pressure tube 24 is connected with an axial bore of the shaft 3. The pressure in said tube 24 is controlled by an electrovalve 26 connected in series and is supervised by a reduced pressure gage 25.

The axial bore in the shaft 3 is connected with a retaining head 4 disposed at the end of the conveyor arm 6, said head taking up and retaining the particles 16 by means of reduced pressure. The retaining head 4 is mounted on the conveyor arm 6 by means of springs 2, the degree of its resilience being recorded by sensors 18', 18'', 18'''.

A microprocessor-control unit, whose block diagram is illustrated in FIG. 3, is provided for controlling the indexing plate 8 and the conveyor 13. The outputs of all proximity sensors 18 and the reduced pressure gage 25 are by means of wires 27 connected with input amplifiers 28 whose outputs correspond with a central processor unit 36 as well as with an operating and indicating unit 33. The central processor unit 36 is, furthermore, connected with a memory 35. All electric components are fed by a power unit 34. The CPU 36 can, depending on the output signals of the input amplifier 28, which define exactly the course of the operation of the contrivances 8 and 13, call the required program steps in the memory 35 and accordingly activate drivers 29 by means of wires 30, 31, 32 controlling the driving motors 20, the electrovalve 26 etc.

Further contrivances belonging to the device, such as the welding device 9, the deposit 10 etc., are in the above-described manner connected with the CPU 36.

In the following the process in accordance with the present invention will be described in particular detail by means of the lifting-and sluing conveyors 13 according to FIGS. 2 to 4.

The particles 16 are to be transported from the vibration conveyor 5 by means of the lifting- and sluing conveyor 13 into the receiving tools 7 of the indexing plate 8. The particles (work pieces) 16 are taken up and held by the retaining head 4 by means of vacuum, and blown off by means of compressed air.

During the whole operation—picking up of the particles 16 from the vibration conveyor 5, lifting-, sluing- and lowering motion—the presence of the particles 16 and their depositing in the receiving tool 7 is supervised by the reduced pressure gage 25.

The sensor 18' supervises the correct positioning of the particles 16 on the centering bolt 15 and in the centering device of the receiving tool 7. If the bore of the particle 16 is smaller than the set value, or if the external diameter of the particle 16 is greater than the set value, or if the position of the particle 16 is inaccurate (e.g. due to lateral displacement caused by inexact picking up from the vibration conveyor 5) the retaining head 4 exerts too much pressure on the springs 2 during the downward movement of the arm 6, which is recorded to the CPU 36 by the sensor 18'.

Dependent on the programming of the memory 35 the subsequent correcting operation can comprise a repetition of the lowering- (joining-) process or/and (in the case of a negative result) a reconveying of the particle, dropping the particle into the container 19 during the return movement and a repetition of the conveying- and joining process with a new particle.

When lifting the work piece from the vibration conveyor 5 the sensors 18'' and 18''' control (again by measuring the pressure of the retaining head 4 against the springs) if the thickness of the particle 16 is within a set tolerance.

The sensor 18''' detects excessively thick particles (the retaining head 4 is not sufficiently lowered, the sensor 18''' is not activated); the sensor 18'' detects too thin particles (the retaining head 4 is lowered too much, the sensor 18'' is activated).

The program of the memory is such that particles being too thick and too thin are picked up from the vibration conveyor and dropped into the container 19. The checking and dropping process is much shorter (about 30-50%) than a normal conveying cycle.

The sensors 18', 18'' and 18''' record to the CPU 36 if the work piece has been conveyed from the vibration conveyor 5 into the receiving tool 7, if the joining process, i.e. the inserting of the work piece into the receiving tool 7, was correctly carried out and if the dimensions, such as external diameter, bore and thickness of the work piece lie within a certain tolerance.

In the case of a negative result of one or more of these checks the CPU 36 effects according to the corresponding program of the memory 35 the immediate repetition of the conveying process so that inadequate particles (not lying within the tolerance, not joinable, not precisely positioned) can be excluded without causing any delay. If, for example, the welding process of the welding device 9 takes more time than the checking- and correcting process of the conveyor 13 the normal cycle of the CPU need not be interrupted. Thus, the system allows a continuous checking of the operating processes (conveying and joining) as well as the correction of errors and the exclusion of inadequate work pieces without any unjustified loss of time.

The arrangement, number and functional principle of the sensors varies according to the problem to be solved and the characteristics of the work piece, the control programs (correcting programs) are such that errors can be eliminated within the shortest possible period and without causing any unnecessary delay of the process.

The application of the principle of the present invention, i.e. to start eliminating the error at a certain processing stage or contrivance independently of a cycle common to the entire plant and immediately after the detection of the error is not limited to the feeding process. In the illustrated welding device 9 the correct position of the plates to be welded can be checked by means of checking the length of the lifting movement of the welding head. When an irregularity is detected the welding head can be lowered again. If the error cannot be eliminated the welding process can be omitted, thus, at least avoiding the destruction of the plates.

The deposit 10 is preferably adapted to suck up the welded parts and to drop them subsequently by means of a compressed air blast. In this case a further compressed air blast can be provided when the central control unit has been informed that the first drop was unsuccessful.

I claim:

1. An improved method for controlling a system comprising a number of operating stations during the processing of particles by a common pre-set cycle; at least one of said operating stations employing a feeding device, and sensor means for detecting a fault in one of said operating stations to thereby retain said pre-set cycle for initiating a correcting process, the improved method comprising: taking up one of said particles by said feeding device and conveying said particle to a receiving tool and moving said feeding device back into its original position, said particle being retained during operation of the feeding device at reduced pressure; monitoring said reduced pressure by a first of said sensor means, whereupon indication of a deviation from said reduced pressure stops the cycle of said feeding device, and after which, independent of said common, pre-set cycle, immediately repeating said cycle of said feeding device from the beginning to initiate a correction process; said taking up and deposition of one of said particles being carried out by lifting and lowering motion of said feeding device, monitoring the extent of said lifting and lowering motion by a second sensor means which senses deviation from a pre-set extent, a correcting process also being initiated independently of said common pre-set cycle upon sensing of a deviation by said second sensor means.

* * * * *